Patented Sept. 25, 1945

2,385,586

UNITED STATES PATENT OFFICE 2,385,586

CONDENSATION OF PHENOLS WITH SULPHITE WASTE LIQUOR

Hermann Rudy and Rudolf Watzel, Mannheim, Germany; vested in the Alien Property Custodian No Drawing. Application March 13, 1942, Serial No. 434,622. In Germany January 18, 1941

3 Claims. (Cl. 260—17.5)

The present invention relates to the manufacture of condensation products from sulphite waste liquor and phenols under heating in presence of acids.

A process is known, according to which phenol is condensed together with different kinds of sugar, and the resulting sugar-phenol-resin reacted with sulphite waste liquor. In this process, however, phenol is not condensed with sulphite waste liquor, but the phenol in excess is removed before mixture.

Furthermore, a process for the extraction of lignin from wood has been developed, which provides condensing lignin with boiling phenol in presence of acids, whereat the application of phenol in great excess is necessary. The phenol-lignin thus obtained is slightly soluble in water. According to a recent conception, the ability of condensation of lignin with phenol is said to be restricted by sulphonating the phenol.

Now the surprising discovery has been made that valuable technical products are obtained by condensation of sulphite waste liquor with phenol or phenol-like substances in presence of acid under heating. The condensation products, being well soluble in water, possess lathering power and other capillary-active properties. The sulphite waste liquor can be used either in solution or in form of dried powder. It is expedient to start with cleaned sulphite waste liquor, having a low content of ash.

As an initial material for the present process the simple phenols can be used in first line. Furthermore are suitable the substituted as well as such phenols, containing different hydroxyl groups, for example cresols, xylenols, naphthols, salicylic acid, pyrocatechine, resorcin, hydroquinone, pyrogallol, pyrogallic acid etc. Finally, the compounds formed by simple linkage of two or more aromatic nucleus, such as dioxy-diphenyl-sulphone, dioxy-diphenylmethane etc., can be employed with advantage. So far as the melting points of the mentioned compounds are above the desired temperature of reaction, it is advisable to apply them in mixture with other compounds, melting at lower temperatures, preferably with phenol or homologous substances.

To carry out the condensation, concentrated and diluted hydrochloric acid, sulphuric acid, orthophosphoric acid, as well as metaphosphoric acid, and especially those phosphoric acids having a low proportion of water molecules, the $P_2O_5$-content of which is between that of ortho- and metaphosphoric acid, are suitable.

According to the present invention, condensation is carried out at temperatures between 50 and 150° C., preferably between 70 and 120° C. At the beginning careful working is recommended, in order to avoid the formation of high-molecular, insoluble products.

The proportion of the amounts applied of phenol and sulphite waste liquor can be varied within a wide range. As a rule, however, equimolecular proportions will be chosen, starting thereby from the weight of 180 for one gram molecule of lignin. If working with rapid-condensing compounds, it is advantageous to keep the rate of phenol below 1 gram molecule or to dilute it by addition of such phenol substances, reacting less energetically. The amount of acid is chosen so that the pH-value of the initial mixture is below 4.

*Example 1.*—300 g. of pulverized, dry sulphite waste liquor with an ash content of 4 to 6% are thoroughly mixed with 75 g. of molten phenol and 200 g. of anhydrous phosphoric acid of a $P_2O_5$-content of 82 to 86%, the phosphoric acid having before been heated to 150° C. The mass is left standing for some time. The temperature at which the mass commences to gradually soften is from 70° to 90° C. As soon as cooling begins, the compound or mass is again heated for a short time in a boiling water bath, until a homogeneous, relatively fluid substance is obtained, which solidifies after cooling to a black resin, well soluble in water.

*Example 2.*—300 g. of pulverized sulphite waste liquor with an ash content of 4 to 6% are mixed with 75 g. of phenol and 12 g. of anhydrous phosphoric acid, having a $P_2O_5$-content of 86%. The mixture is then heated in the oil bath up to 110 to 120° C. for 2 or 3 hours. After cooling, a black, brittle resin, easily soluble in water of pH 2.8 to 3.0 is obtained.

*Example 3.*—Working as per Example 2 with the modification that instead of phenol 115 g. of α-naphthol are used and the mass is heated to 130° C. for 1 hour.

*Example 4.*—To 300 g. of pulverized, dry sulphite waste liquor are added: at first a molten mixture of 50 g. of resorcin and 30 g. of phenol, and in addition 200 g. of phosphoric acid of a $P_2O_5$-content of 85%, the phosphoric acid having before been heated to 150° C. After having left the mass to itself for some time, it is heated in the oil bath to 130° C. for 1 hour. In this way a well lathering, water-soluble product is obtained.

What we claim is:

1. The process for the manufacture of condensation products from sulphite waste liquor and phenols which comprises reacting at 70° to 130° C., a mixture consisting of pulverized, dried sulphite waste liquor of 4 to 6% ash content, a phenol and anhydrous phosphoric acid of 82 to 86% $P_2O_5$ content, the phosphoric acid being present in sufficient quantity to impart to the initial mixture a pH below 4, continuing the reaction until a homogenous fluid mass is obtained which solidifies on cooling to a resin readily soluble in water and then cooling the mass.

2. A process for the manufacture of condensation products of sulphite liquor and phenols which comprises reacting at a temperature between 50° and 150° C. a mixture consisting of dried sulphite waste liquor, a phenol and anhydrous phosphoric acid, the $P_2O_5$ content of which is between that of ortho and meta phosphoric acid, the phosphoric acid being present in quantity to impart to the initial mixture a pH below 4, continuing the reaction until a homogeneous relatively fluid substance is obtained and cooling, thereby producing a resin soluble in water.

3. The process for the manufacture of condensation products from sulphite waste liquor and phenols which comprises reacting at 70° to 120° C. a mixture consisting of about 300 parts by weight of pulverized dried sulphite waste liquor of 4 to 6% ash content and about 75 parts by weight of phenol and from about 12 to 200 parts by weight of anhydrous phosphoric acid of 82 to 86% $P_2O_5$ content and thereby imparting to the initial mixture a pH below 4, and continuing the reaction until a homogeneous fluid mass is obtained which solidifies on cooling to a resin readily soluble in water and then cooling the mass.

HERMANN RUDY.
RUDOLF WATZEL.